(12) United States Patent
Kussmann et al.

(10) Patent No.: US 11,061,562 B2
(45) Date of Patent: Jul. 13, 2021

(54) METHOD FOR PROVIDING HAPTIC FEEDBACK TO AN OPERATOR OF A TOUCH-SENSITIVE DISPLAY DEVICE

(71) Applicant: Robert Bosch GmbH, Stuttgart (DE)

(72) Inventors: Holger Kussmann, Giesen (DE); Ingo Hermanns, Hildesheim (DE); Markus Langenberg, Hannover (DE); Werner Poechmueller, Sibbesse (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/651,504

(22) PCT Filed: Sep. 20, 2018

(86) PCT No.: PCT/EP2018/075417
§ 371 (c)(1),
(2) Date: Mar. 27, 2020

(87) PCT Pub. No.: WO2019/072512
PCT Pub. Date: Apr. 18, 2019

(65) Prior Publication Data
US 2020/0264772 A1      Aug. 20, 2020

(30) Foreign Application Priority Data

Oct. 11, 2017   (DE) .......................... 102017218120.6

(51) Int. Cl.
*G06F 3/0488*   (2013.01)
*G06F 3/01*     (2006.01)

(52) U.S. Cl.
CPC .......... *G06F 3/04886* (2013.01); *G06F 3/016* (2013.01)

(58) Field of Classification Search
CPC .. G06F 3/04186; G06F 3/04886; G06F 3/045; G06F 3/016; G06F 3/0487; G06F 3/04883
See application file for complete search history.

(56) References Cited

U.S. PATENT DOCUMENTS

2007/0157089 A1*  7/2007  Van Os ............... G06F 3/04817
                                               715/702
2008/0024459 A1   1/2008  Poupyrev et al.
(Continued)

FOREIGN PATENT DOCUMENTS

DE     1020090488832 A1    4/2011

OTHER PUBLICATIONS

International Search Report for PCT/EP2018/075417, dated January 7, 2019.

*Primary Examiner* — Ke Xiao
*Assistant Examiner* — James S Nokham
(74) *Attorney, Agent, or Firm* — Norton Rose Fulbright US LLP; Gerard Messina

(57) ABSTRACT

A method for providing haptic feedback to an operator of a touch-sensitive display device. The method includes providing an operator interface to be represented in the display device as image data; the operator interface having at least one button assigned to a function to be controlled, graphically displayed in the operator interface, and graphically delimited from the rest of the operator interface; analyzing the image data for a presence and a position of shapes for representing a button; determining an intended display region of a shape, which is to be represented and is identified as a button; representing the image data of the operator interface in the touch-sensitive display device; outputting haptic feedback in response to detection of contact with the touch-sensitive display device in the region of a surface of
(Continued)

the touch-sensitive display device which is assigned to a display region of a shape identified as a button.

9 Claims, 2 Drawing Sheets

(56) References Cited

U.S. PATENT DOCUMENTS

| | | | |
|---|---|---|---|
| 2008/0082930 A1* | 4/2008 | Omernick | G06F 1/1684 |
| | | | 715/765 |
| 2009/0178008 A1* | 7/2009 | Herz | G06F 3/017 |
| | | | 715/840 |
| 2012/0154328 A1* | 6/2012 | Kono | G06F 3/016 |
| | | | 345/174 |
| 2012/0299859 A1* | 11/2012 | Kinoshita | G06F 3/04186 |
| | | | 345/173 |
| 2014/0165006 A1* | 6/2014 | Chaudhri | G06F 3/0487 |
| | | | 715/835 |
| 2015/0169059 A1* | 6/2015 | Behles | G06F 3/04883 |
| | | | 345/173 |
| 2015/0365306 A1* | 12/2015 | Chaudhri | G06F 3/04886 |
| | | | 715/736 |
| 2016/0124626 A1* | 5/2016 | Lee | H04M 1/72412 |
| | | | 715/747 |
| 2016/0202761 A1 | 7/2016 | Bostick et al. | |
| 2018/0330584 A1* | 11/2018 | Heubel | G06F 3/045 |

* cited by examiner

METHOD FOR PROVIDING HAPTIC FEEDBACK TO AN OPERATOR OF A TOUCH-SENSITIVE DISPLAY DEVICE

BACKGROUND INFORMATION

An operating method for a touchscreen, in which a pressure measurement for detecting contact with the touchscreen at a particular position is made, is described in U.S. Patent Application Pub. No. US 2008/0024459 A1; haptic feedback being outputted to an operator as a function of contact and as a function of an element of a graphic operator interface assigned to a position of the contact. In addition, haptic feedback may be a function of the pressure, which is detected in response to contact with the operator interface at the position of the element represented in the graphic operator interface.

SUMMARY

An example method of the present invention for providing haptic feedback to a user of a touch-sensitive display device has the advantage that haptic feedback may also take place for an operator interface, which is represented in the touch-sensitive display device and has buttons represented in the operator interface, when, with the exception of an image information item itself, no data for forming the operator interface and, in particular, with regard to a position of buttons, are transmitted or provided by a further processing unit to the touch-sensitive display device having haptic feedback.

In such a starting situation, a user should also be given haptic feedback in an advantageous manner, if he/she contacts the touch-sensitive display device in the region of a button, in order that they receive feedback as to whether they actually met the button and manipulated it, or whether they possibly touched a region of the surface of the touch-sensitive display device, which is not assigned to any button, and in response to contact with which no function of an electrical device to be controlled is initiated. Thus, the touch-sensitive display device may also be operated for the case, in which a user does not have the display device in their field of view while manipulating it. For the case, in which they do have the display device in their field of view, they haptically receive direct feedback about successful manipulation. For this, however, the touch-sensitive display device having haptic feedback must know a position, for which haptic feedback should be given, since otherwise, selective haptic feedback only in response to contact with a button is not possible.

In this context, a button is understood to be, on one hand, a surface, in response to contact with which a switching operation is carried out in a manner similar to a push-button. In addition, however, a button should also be understood as a surface for further operating elements constructed differently, such as sliding switches or rotary elements.

In order to design, for a user, operation of a touch-sensitive display device having haptic feedback in an effective and sensible manner, the haptic feedback must also take place as soon as possible after a detected touch. If the haptic feedback first occurs one or possibly more seconds later, then it is possible for haptic feedback to no longer be perceived by a user as helpful. If an information item regarding whether a haptic acknowledgement is to be outputted is provided by an external processing unit after the transmission of a detected touching position, then it is possible that the haptic feedback may no longer be outputted in a timely manner.

Therefore, according to the present invention, an information item regarding haptic feedback is provided immediately by the touch-sensitive display device, in order that current haptic feedback may take place. To this end, in addition to transmitted image data, it is not necessary to transmit data, for example, about a display position of a button in a display, to the touch-sensitive display device. For the display device is even capable of automatically ascertaining, from just the transmitted image data, possible positions of buttons in a display of an operator interface to be represented. Therefore, it is also possible to give haptic feedback in response to contact with a button, for the case in which a position of the button on a touch-sensitive display is not provided externally to the touch-sensitive display, e.g., when only image data of an operator interface are transmitted by an external computing device, or when the position of the button on the touch-sensitive display device is changed by a user or by an application. Thus, for example, it may also be possible, for example, for haptic feedback to be given for the case, in which a computing device, that provides an operator interface, has no knowledge that a touch-sensitive display device for operating this computing device specifically gives haptic feedback via the operator interface provided by the external computing device, in response to contact with displayed buttons and in response to detection of contact with one of the buttons. In particular, the additional transmission, by a further computing device, of control data for the touch-sensitive display device having haptic feedback may be omitted, since all of the data necessary for the haptic feedback are provided by the touch-sensitive display device itself.

In this context, the data necessary for timely haptic feedback via buttons represented in the display are acquired with the aid of an automatic image analysis of the image data of the operator interface. In this connection, one utilizes the fact that buttons in operator interfaces graphically represented in a display are, generally, clearly distinguished from a background in the display with regard to their color, their brightness and/or their texture, since a user should also recognize a button easily in the case of selection without haptic feedback. These differences in parameters of the display are utilized for the image analysis, namely, by considering regular patterns, such as lines of demarcation and shapes produced by them, in particular, in view of a minimum or maximum size or surface, in order to determine a position of such buttons by an image analysis. Thus, rapid, haptic feedback may also be permitted for an operator interface, if a layout of the operator interface and, in particular, positions of the buttons, were not known to the touch-sensitive display device beforehand.

Further advantages are derived from the description of example embodiments herein. In particular, it is advantageous to give haptic feedback by setting a surface of the touch-sensitive display device into vibration. Such haptic feedback may be generated with a relatively low amount of expenditure and may easily be felt by a user.

In addition, it is advantageous to transmit a coordinate of contact with the touch-sensitive display device back to the processing unit, by which the image data of the operator interface were provided. From the coordinate, it may ascertain an association with the operator interface and consequently assign a function and/or a button and then initiate the assigned function. Consequently, the input undertaken by a user may be processed, in particular, by an external computing device, as well.

In particular, data transport of the image data over a wireless interface is advantageous, since this also allows an external device, such as a smartphone, to be connected to a touch-sensitive display device.

Furthermore, it is advantageous for the stored shapes of buttons to include polygons, ellipses or shapes having predefined textures or colors, since in this manner, a multitude of possible buttons may be detected. In this connection, in a first specific embodiment, a shape may be understood as the outer geometric shape of a button. In a further specific embodiment, different shapes may also be understood as an identical shape having a different color design. Thus, in one specific embodiment, it is also possible to identify a shape of a button simply from coloring differing from that of a background color or from a texture differing from a background texture.

In addition, it is advantageous that a feature of the haptic feedback is selected to be a function of a feature of the shape, which is identified as a button and is assigned to the display region of the surface of the touch-sensitive display device, in which contact has been detected. Thus, it is also possible to provide different haptic acknowledgements for different shapes of buttons, for example, different frequencies of a vibration or a different number of vibrations. Consequently, not only does a user have the possibility of determining that he/she touched a button and not a functionless surrounding area of a button, but they may also be given feedback as to which button they touched. Since in each instance, different instructions for haptic feedback are automatically selected, using a comparison with a stored number of shapes, it is not necessary for such a shape specification to be transmitted, together with the image data, by an external computing device. On the contrary, the touch-sensitive display device may determine such a specification itself.

For the case that, in response to contact with an ascertained shape, which till now, however, has not been identified as a shape of a button, contact in this region is actually detected, it is also advantageous that a possible shape not previously stored in the storage device is ascertained as a new shape and supplied to the storage device as a possible shape for a button. For example, this may also not take place, until the touch-sensitive display device has been touched several times in the region of this shape.

In particular, it is advantageous to recognize the represented shape as a button, when after the transmission of a coordinate of contact to an external processing unit, the image data of a transmitted operator interface change. For as a rule, successful manipulation of a button also results in a change to the construction of the operator interface, either by display of a confirmation of an instance of manipulation, or by display of a new operator menu. Thus, if a user touches the video screen at a position and the content of the video screen subsequently changes completely or partially, then it may be deduced from this, that a confirmation of a button has occurred. A haptic acknowledgement may be advantageously initiated in the future in response to contact with a corresponding surface.

In addition, it is advantageous that an analysis of transmitted image data only takes place, if the image data remain unchanged for a predefined period of time. Consequently, it is ensured that the transmitted image data are data about an operator interface, which, as a rule, remain unchanged for a predefined period of time of at least 10 seconds for detecting at least an instance of manipulation by a user. In particular, this makes it possible to distinguish instances of animation, such as an appearance of an operating window through flying-in or enlargement, as well as a representation of moving images, from a display of an operator interface, for an analysis for possible buttons for reproducing haptic feedback in response to contact with these buttons.

Such suppression of haptic feedback during a change in a graphic display is not disadvantageous, since as a rule, for example, during executed animation, user input is, generally, not supposed to take place.

Corresponding advantages of the present invention are found in a display device having a touch-sensitive surface for implementing the example method, as well as in a corresponding computer program and a computer-readable medium, in which the computer program is stored.

BRIEF DESCRIPTION OF THE DRAWINGS

Specific embodiments of the present invention are represented in the figures and explained in greater detail below.

DETAILED DESCRIPTION OF EXAMPLE EMBODIMENTS

The present invention may be used for any touch-sensitive display devices. In particular, use for a driver information device in a motor vehicle is advantageous, since the driver in a vehicle should concentrate on the action of driving, and consequently, he/she should focus on the traffic in the surrounding area of the vehicle that they are steering. As he/she may be advantageously given haptic feedback, their attention may be allowed to remain on the road, while they may manipulate, in particular, blindly, an operator interface having different buttons.

In a vehicle, it is also possible to connect a cellular phone, in particular, a so-called smartphone, via different protocols, to a driver information device installed in the vehicle. In this connection, an operator interface of the cellular phone is shown in a touch-sensitive display device of a driver information system installed in the vehicle. The image of the operator interface is generated by the cellular telephone or the portable computer device and is advantageously rendered; the image data consequently generated being transmitted to the driver information system in the vehicle and being displayed by it. However, additional data about specific image content, itself, for example, a position of buttons in an operator interface, are not transmitted along. But, using the method of the present invention, the driver information system may decide, from the transmitted image data, at which positions of the transmitted image a button is situated, for which haptic feedback is intended to be given in response to contact with a corresponding position of a touch-sensitive display device of the driver information device in the vehicle. Thus, the present invention is explained in the following, using a driver information device in a vehicle as an example.

Figure 1:
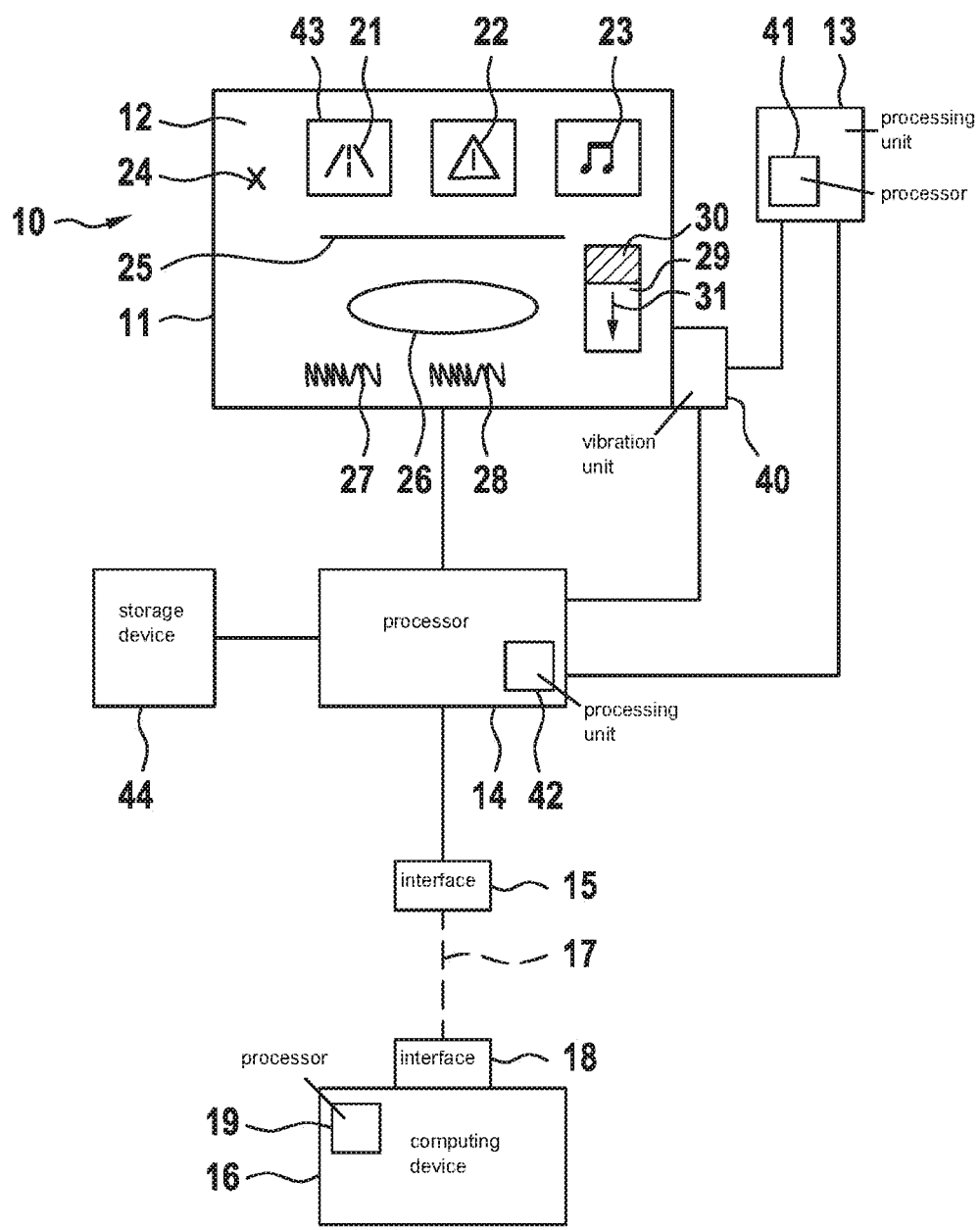
FIG. 1 shows a display device having a touch-sensitive surface, together with an external computing device.

A touch-sensitive display device 10 of a driver information device in a vehicle is shown in FIG. 1. Display device 10 includes a display unit 11, which has a display surface 12. Display unit 11 is constructed, for example, as a liquid crystal display or as an OLED display. Display surface 12 is configured to be touch-sensitive, so that a coordinate of contact with display surface 12 may be ascertained and may be evaluated and processed further by a processing unit 13. In particular, it is possible, for example, to determine a position of contact on surface 12 capacitively, or by evaluating a pressure matrix.

Image content, which is represented on display surface 12, is provided by a processor 14. For representation on display surface 12, processor 14 processes image data, which, in the specific embodiment shown here, are transmitted through an interface 15 by an external computing device 16, via a data connection 17. Computing device 16 has a corresponding interface 18, as well, for communication via data connection 17. Data connection 17 is implemented, for example, as near-field communication, such as ZigBee or Bluetooth. In addition, a WLAN connection or a connection according to a different protocol is possible for wireless data transmission. Furthermore, as an alternative, wired data transmission is also possible, e.g., via a USB interface. A processor 19 of computing device 16, which is manufactured, for example, as a portable computer, in particular, a cellular telephone or a so-called smartphone, determines the image data of an image represented in display device 12. In particular, processor 19 of computing device 16 determines image data of an operator interface, with the aid of which functions of computing device 16 are intended to be controlled. To this end, the data of the operator interface are transmitted via data connection 17 to processor 14, which processes these image data and displays them on display surface 12.

An example of the display of an operator interface is shown in FIG. 1. In this connection, a first symbol 21, a second symbol 22 and a third symbol 23 are represented in an upper half of display surface 12. In response to contact with display surface 12, a coordinate of the contact is ascertained by processing unit 13 and transferred to processor 14. Processor 14 transmits the coordinate value to computing device 16 via data connection 17. In particular, this coordinate is transferred together with a coordinate regarding the dimensions of the entire operator interface represented on display surface 12. For example, a reference to an upper left corner of the represented operator interface is indicated. Consequently, processor 19 may set a position of the acquired coordinates with respect to a position within the operator interface transmitted to processor 14 in the form of image data. For example, if operator interface 12 is touched inside of a surface of first symbol 21, processor 19 may then determine that contact within first symbol 21 has occurred. At this point, software runs on processor 19; in accordance with the software, contact with first symbol 21 being assigned to a specific function of computing device 16, e.g., a start of travel route navigation. Computing device 16 now executes this function. In some instances, this may change an operator interface to be shown on display surface 12. Thus, modified image data are possibly transmitted to processor 14 for depiction on display surface 12.

Other functions are optionally assigned to second and third symbols 22, 23. If contact occurs at a position of the operator interface outside of one of the symbols, for example, at the spot 24 denoted by an X in FIG. 1, then processor 19 determines from the coordinate, that no function is stored for this position and, therefore, that the graphic display on display surface 12 stays unchanged and, also, that no function of computing device 16 is executed.

Additionally included on display surface 12, are an optical separating line 25 not having an input function; an oval button 26; textual information 27, 28 not having a switching function; and a sliding switch 29, in which a control element 30 may be controlled and moved within the surface of sliding switch 29 by a user, in that contact with display surface 12 is detected, and in response to subsequent, continuous contact and movement of a contact point, for example, of a finger on display surface 12 in direction of arrow 31, graphic element 30 is displaced in direction of arrow 31, as well.

Now, in a display on display surface 12, it is desirable for haptic feedback to the user to take place in response to contact with symbols 21, 22, 23, as well as in response to contact with button 26 or sliding switch 29. To this end, display surface 12 is connected to a vibration unit 40, which is controlled by processing unit 13, that is, by processor 14. In this context, haptic feedback takes place immediately after detected contact, in the form a so-called "click," which means that immediate haptic feedback gives a user the sensation of having operated a pushbutton that is actually capable of being felt. In this context, the frequency of a vibration and/or the number of clicks may be specified and may possibly generate perceptible, different haptic feedback as a function of the selection. For an operator interface, which is completely processed and made available by processor 14, for example, for control of a driver information function, a coordinate table, at whose positions haptic feedback is supposed to take place, could be provided to processing unit 13 and/or vibration unit 40. An additional processor 41 is advantageously provided, which controls vibration unit 40 in light of these coordinate data, so that haptic feedback may be given to a user as rapidly as possible after detection of contact with display surface 12. In the case of the operator interface transmitted by computing device 16, for example, as shown in the representation in FIG. 1, such an information item is not initially available to processor 14 and, therefore, to processor 41. Thus, for the case in which an operator interface is transmitted by computing device 16 without such an additional information item, an analysis method is started with the aid of a processing unit 42, which analyzes the transmitted image data.

With the aid of the analysis of the image data, regions and, therefore, coordinates are determined, at which haptic feedback is intended to take place. Such an analysis takes place, when the transmitted image data remain unchanged for a predefined period of time, such as two to five seconds. Consequently, it is to be assumed that computing device 16 does not transmit, for example, a film or animation of an operator interface, but a constant graphic display of an operator interface. The corresponding, ascertained coordinate data for a button are stored after the analysis and utilized by processor 41 for controlling vibration unit 40, until processor 14 determines that the image data transmitted by computing device 16 have changed, and that consequently, in some instances, haptic feedback must be adapted, as well.

In the following, a determination of the coordinates, in light of which haptic feedback is intended to take place, is explained, using an image analysis. The fact that buttons in a representation of an operator interface differ from their environment in a systematic manner is utilized, in particular, for the analysis. They may be delimited from the surrounding area, for example, by an edge. In addition, they may differ from a background in the brightness and/or the color of the display. Generally, a button is delimited from the background by a straight line or at least partially straight line or smoothly-running line, such as a curve. In an image analysis, it is possible to detect corresponding differences in color and/or brightness, so-called borders. Thus, for example, in the representation shown in FIG. 1, first symbol 21 is delimited from a background of the operator interface by a frame 43. Thus, in a first exemplary embodiment, it is possible, using an analysis, to ascertain such borders and their position in a graphic display, in which a difference in brightness and/or color of, in each instance, at least a minimum degree occurs in a limited area. Consequently, for example, characteristic representations of a color profile may be faded out in the background and no longer considered. In addition, it is advantageous to designate a minimum dimension in the case of a length of a border, so that, for example, textual outputs, such as text representation 27, 28 in FIG. 1, are not also recognized as a boundary line of a button in a display.

In a first specific embodiment, for example, contact with optical separating line 25 may also be assigned a haptic acknowledgement, in particular, based on its length.

In a further specific embodiment, it is checked if a plurality of straight lines enclose a surface; a button being detected in this case, and haptic feedback being outputted in response to contact with a boundary line of the button. Thus, the edges of symbols 21, 22, 23, separating line 25, an edge of button 26 and of sliding switch 29 are advantageously recognized as the regions, at which haptic feedback should be given. Preferably, a minimum width of a specific edge is provided as a triggering rule for haptic feedback. Thus, in this exemplary embodiment, a user may feel for at least the borders of buttons, which are represented in the display. No haptic feedback is outputted for optical separating line 25, since it does not form the boundary of a button. In a further specific embodiment, it is also possible to distinguish buttons from backgrounds with the aid of an image texture, for example, a pattern, with which the background and/or the buttons are stored.

To determine an enclosed surface, it is possible, after identification of corresponding borders, to establish if edges are connected and, consequently, a closed region is delimited. Such a delimited region is initially designated as a shape, which covers a particular area of the upper surface of display surface 12 with its representation. Processor 14 now compares the size, the shape, and/or the dimensions of the detected shape to shapes or values stored in a storage device 44. Thus, a minimum size, which corresponds to an instance of manipulation by a finger or by a probe element, is advantageously provided for detection as a button. Predetermined examples of shapes for buttons, such as polygons, in particular, rectangles, and ellipses, in particular, circles, which are normally used by designers of operator interfaces for functional control, are stored in storage device 44. In this connection, a polygon and/or a rectangle should also be understood as polygons and/or rectangles, in which the corners are rounded. At the coordinates in the surface regions, on which a representation of a shape that is intended to be used as a button is ascertained on display surface 12, haptic feedback is intended to occur in response to detected contact at the specific coordinate of display surface 12. Corresponding coordinate data are transmitted by processor 14 to additional processor 41. In addition, in one further specific embodiment, the color of the specific shape, in particular, the fill color of the shape, may also be ascertained and taken into consideration for detecting a button.

Figure 2:
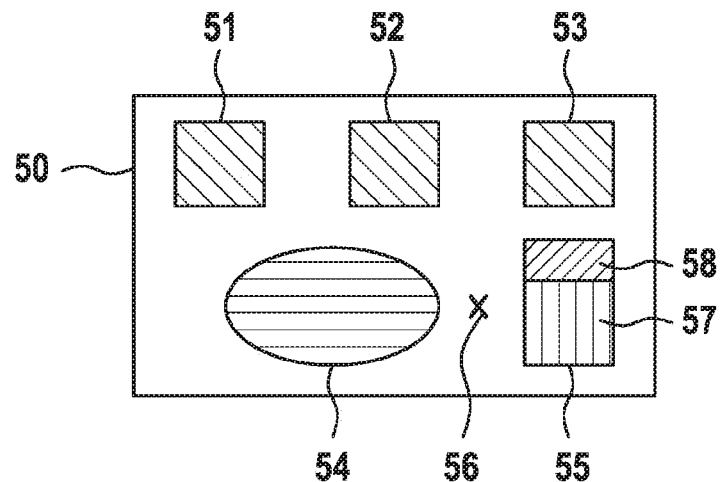
FIG. 2 shows an example of assignment of an operator interface represented in the touch-sensitive display shown in FIG. 1, to surfaces in which haptic feedback is intended to take place.

In FIG. 2, display surface 12 is schematically represented in a display 50, in which haptic feedback is outputted in response to contact with a first surface 51 of first symbol 21, with a second surface 52 of second symbol 22, with a third surface 53 of third symbol 23, with a fourth surface 54 of button 26, and with a fifth surface 55 of sliding switch 29. If the operator interface is manipulated outside of surfaces 51, 52, 53, 54, 55, for example, at the position 56 marked by X, no haptic feedback takes place.

In one specific embodiment, it is also possible to select the haptic feedback, for example, according to a vibration frequency or a number of haptic feedback occurrences, as a function of the shapes, within whose assigned area contact with display surface 12 occurs. Thus, in response to contact within one of symbols 21, 22, 23, a first haptic acknowledgement occurs in accordance with a first hatching of corresponding surfaces 51, 52, 53 represented in FIG. 2, in response to contact with button 26, a second haptic acknowledgement represented by a second hatching of fourth surface 54 occurs, and in response to manipulation of sliding switch 29, a third haptic acknowledgement represented by a third hatching of fifth surface 57 occurs. In the example of sliding switch 29, manipulation within the region of sliding-switch element 30 or of the remaining area of sliding switch 29 may be distinguished; in this case, a fourth haptic acknowledgement occurring, represented by hatching of a sixth surface 58.

In a further specific embodiment, it is also possible for recognition of buttons to take the form of a learning system, in particular, in the form of a so-called deep learning system or a neural network. Learning may take place, for example, by detecting and storing a button in the future, which is not detected as a button initially. By way of example, let it be assumed that elliptically-shaped button 26 is not stored in storage device 44 initially. Here, in the starting situation, only rectangular buttons, for example, in accordance with symbols 21, 22, 23 and sliding switch 29, are stored. In its analysis, processor 14 does detect a closed shape, but ascertains that this shape is not defined as a button. Now, if contact with the display device subsequently occurs within this button, then the coordinate of contact is transmitted by processor 14 to computing device 16. However, since contact within elliptical surface 26 is interpreted as contact with a button, computing device 16 then changes the graphic display as a result of the present manipulation and shows, for example, a different operator menu. This is detected by processor 14. As a result of manipulation of the operator interface, it detects this change in the image data as contact with a button.

Consequently, processor 14 assigns the function of a button for future instances of manipulation of an elliptical surface in accordance with area 26 and stores this information in storage device 44.

In a further specific embodiment, it is also possible to detect a shape not already defined as a button in response to a first possible detection, in order to prevent faulty assignments due to a coincidental change of image.

Furthermore, it is also possible to use in-depth methods of image analysis, for example, a semantic image analysis or an image analysis including symbol recognition or automated text recognition, for an analysis of an operator interface provided.

For the start of such a function, it is also possible to use a trained neural network, which has been trained, using a plurality of different operator interfaces providable by, in particular, different possible computing devices, such as various smartphones. Consequently, using a suitable analysis, it is possible for the neural network to assign each pixel of a provided operator interface an information item regarding whether this pixel is a part of a button or not part of a button.

Storage device 44 may be assigned locally to processor 14, for example, in a vehicle. In addition, however, it is also possible for storage device 44 to be connected to processor 14 via a data network, and to be available to a plurality of processors. Thus, a self-adaptive algorithm may also take the form of a cloud-based neural network.

Figure 3:
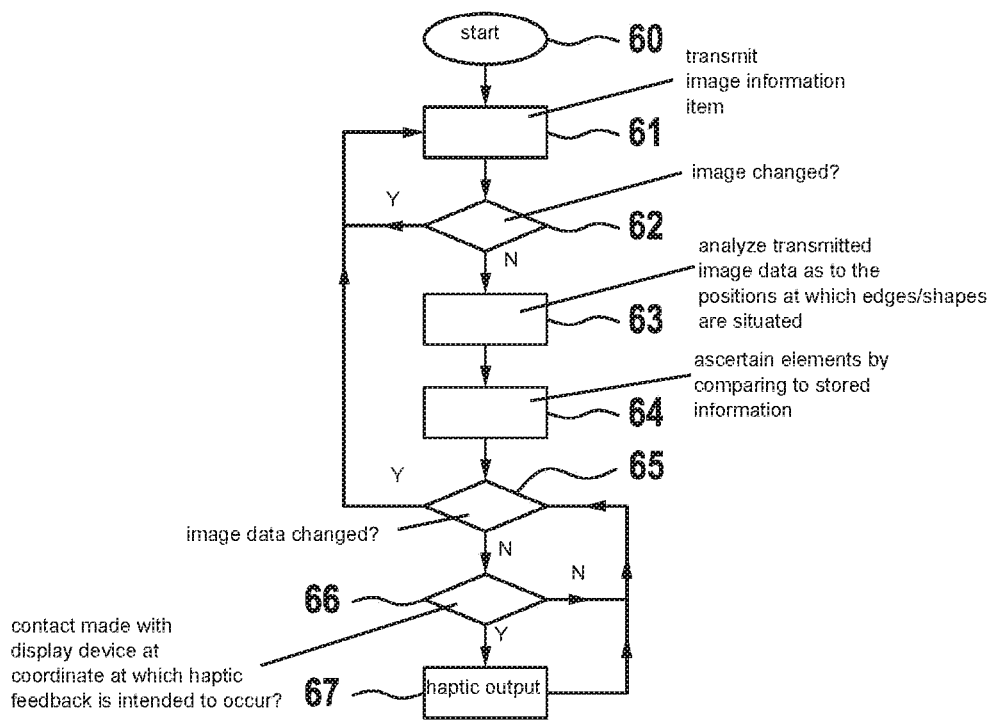
FIG. 3 shows an example of a method for providing haptic feedback to an operator of a touch-sensitive display device.

An example of a method sequence is shown in FIG. 3. The method is started, using a beginning step 60 as a starting point, for example, connecting a mobile computing device to a driver information device in the vehicle. In an image transmission step 61, an image information item is transmitted to a processor of a touch-sensitive display device. In a subsequent checking step 62, it is checked if the image data have changed within a predefined period of time of, for example, two seconds. If this is the case, then the method branches back to image transmission step 61. If this is not the case, that is, if at least the content of the image data remains constant, then the method branches further to an analysis step 63, in which the transmitted image data are consequently analyzed as to the positions, at which edges and/or closed shapes are situated.

In a subsequent evaluation step 64, the elements in the graphic display, which are shapes, in particular, closed surfaces, that are assigned a switching function, are ascertained by comparing shapes acquired in the transmitted image data to stored shapes, for example, to stored edges, polygons or ellipses, or to any surface regarding their shape and/or other characteristic features, such as color or texture. The display-surface coordinates assigned to these shapes, that is, the regions of the display surface covered by these shapes, are assigned an output of haptic feedback for the case in which contact is detected at such a coordinate of the display surface. The corresponding coordinates, at which haptic feedback is intended to occur, and the coordinates, at which no haptic feedback is supposed to occur, are determined in the evaluation step and are stored in suitable form in, for example, a volatile memory.

In a subsequent, second checking step 65, it is checked if the image data have changed. If this is the case, then the method branches back to image-data transmission step 61. If this is not the case, then the method branches further to a third checking step 66. In third checking step 66, it is checked if contact has been made with the touch-sensitive display device at a coordinate, at which haptic feedback is intended to occur. If this is not the case, then the method branches back to second checking step 65. If this is the case, then the method branches further to a haptic output step 67. From haptic output step 67, the method branches back to second checking step 65. The method is continued, as long as computing device 16 outputs data about an operator interface to the touch-sensitive display device.

What is claimed is:

1. A method for providing haptic feedback to an operator of a touch-sensitive display device, comprising the following steps:
providing an operator interface, to be represented in the display device, in the form of image data, the operator interface including at least one button, assigned to a function to be controlled, graphically displayed in the operator interface and graphically delimited from the rest of the operator interface;
analyzing the image data with regard to a presence and a position of shapes for representing a button;
determining an intended display region of a shape, which is to be represented and is identified as a button, in the touch-sensitive display device;
representing the image data of the operator interface in the touch-sensitive display device; and
outputting haptic feedback in response to detection of contact with the touch-sensitive display device in a region of a surface of the touch-sensitive display device, the region being a region which is assigned to a display region of the shape identified as the button, wherein the image data are only analyzed when the image data remain unchanged for at least a predefined period of time.

2. The method as recited in claim 1, wherein haptic feedback is given by setting a surface of the touch-sensitive display device into vibration.

3. The method as recited in claim 1, further comprising:
outputting, by the touch-sensitive display device, a coordinate of contact with the touch-sensitive display device, to a computing device, by which the image data of the operator interface are provided.

4. The method as recited in claim 1, wherein the image data are provided via a wireless interface.

5. The method as recited in claim 1, wherein analyzing of the image data includes comparing detected shapes to shapes of buttons stored in a storage device, the stored shapes of buttons including polygons, or ellipses or shapes, and having predefined textures or colors.

6. The method as recited in claim 1, wherein in the outputting of the haptic feedback, a characteristic of the haptic feedback occurs as a function of a characteristic of the shape which is identified as the button and is assigned to the display region of a surface of the touch-sensitive display device, in which region contact has been detected.

7. The method as recited in claim 1, further comprising:
storing a confirmation of the shape identified as the button for the case in which, after identification of the shape to be represented, contact in the display region assigned to the shape is detected.

8. A system, comprising:
a display device having a touch-sensitive surface;
a device for generating haptic feedback; and
a device for providing haptic feedback, via the device for generating haptic feedback, to an operator of the touch-sensitive display device, the device for providing haptic feedback being configured to:
provide an operator interface, to be represented in the display device, in the form of image data, the operator interface including at least one button, assigned to a function to be controlled, graphically displayed in the operator interface and graphically delimited from the rest of the operator interface;
analyzing the image data with regard to a presence and a position of shapes for representing a button;
determine an intended display region of a shape, which is to be represented and is identified as a button, in the touch-sensitive display device;
represent the image data of the operator interface in the touch-sensitive display device; and
outputting the haptic feedback, via the device for generating haptic feedback, in response to detection of contact with the touch-sensitive display device in a region of a surface of the touch-sensitive display device, the region being a region which is assigned to a display region of the shape identified as the button, wherein the image data are only analyzed when the image data remain unchanged for at least a predefined period of time.

9. A non-transitory computer-readable medium on which is stored a computer program for providing haptic feedback to an operator of a touch-sensitive display device, the computer program, when executed on a computer, causing the computer to perform the following steps:

providing an operator interface, to be represented in the display device, in the form of image data, the operator interface including at least one button, assigned to a function to be controlled, graphically displayed in the operator interface and graphically delimited from the rest of the operator interface;

analyzing the image data with regard to a presence and a position of shapes for representing a button;

determining an intended display region of a shape, which is to be represented and is identified as a button, in the touch-sensitive display device;

representing the image data of the operator interface in the touch-sensitive display device; and outputting haptic feedback in response to detection of contact with the touch-sensitive display device in a region of a surface of the touch-sensitive display device, the region being a region which is assigned to a display region of the shape identified as the button, wherein the image data are only analyzed when the image data remain unchanged for at least a predefined period of time.

* * * * *